United States Patent
Dai et al.

(10) Patent No.: US 12,498,385 B2
(45) Date of Patent: Dec. 16, 2025

(54) TEST STRIP AND METHOD FOR DETECTING AMYLOID BETA IN URINE

(71) Applicant: HUNAN QIANKANG TECHNOLOGY CO., LTD., Changsha (CN)

(72) Inventors: Zhengqian Dai, Changsha (CN); Baijun Gu, Melbourne (AU)

(73) Assignee: HUNAN QIANKANG TECHNOLOGY CO., LTD., Changsha (CN)

(*) Notice: Subject to any disclaimer, the term of this patent is extended or adjusted under 35 U.S.C. 154(b) by 1000 days.

(21) Appl. No.: 17/629,398

(22) PCT Filed: Oct. 15, 2019

(86) PCT No.: PCT/CN2019/111303
§ 371 (c)(1),
(2) Date: Jan. 23, 2022

(87) PCT Pub. No.: WO2021/072651
PCT Pub. Date: Apr. 22, 2021

(65) Prior Publication Data
US 2022/0357345 A1 Nov. 10, 2022

(51) Int. Cl.
*G01N 33/68* (2006.01)
*G01N 33/577* (2006.01)

(52) U.S. Cl.
CPC ....... *G01N 33/6896* (2013.01); *G01N 33/577* (2013.01); *G01N 2333/4709* (2013.01); *G01N 2800/2821* (2013.01)

(58) Field of Classification Search
None
See application file for complete search history.

(56) References Cited

U.S. PATENT DOCUMENTS

2013/0323771 A1* 12/2013 Sathe .............. C12Q 1/37
435/23
2015/0010534 A1 1/2015 Pomara

FOREIGN PATENT DOCUMENTS

| CN | 107412782 A | 12/2017 |
|---|---|---|
| CN | 107787326 A | 3/2018 |
| CN | 108169492 A | 6/2018 |
| CN | 108828238 A | 11/2018 |
| CN | 208367017 U | 1/2019 |
| KR | 20180040192 A | 4/2018 |
| KR | 20190001732 A | 1/2019 |
| WO | 0214351 A2 | 2/2002 |
| WO | 2011057475 A1 | 5/2011 |
| WO | 2018018138 A1 | 2/2018 |

OTHER PUBLICATIONS

Ying Wang, et al., Preparation of Colloidal Gold Immunochromatographic Strip for Detection of Paragonimiasis skrjabini, Plos One, 2014, pp. 1-6, vol. 9 No.3., e92034.

* cited by examiner

*Primary Examiner* — Christopher M Gross
(74) *Attorney, Agent, or Firm* — Bayramoglu Law Offices LLC

(57) ABSTRACT

A test strip for detecting Aβ in urine includes a polyvinyl chloride (PVC) bottom plate. The PVC bottom plate is laid with a sample pad, a conjugation pad, a chromatography pad, and an absorbent pad that are overlapped in sequence. The conjugation pad is coated with colloidal gold particles conjugated to a monoclonal antibody. The chromatography pad is provided with a test line on the side proximate to the conjugation pad, and is provided with a control line on the side proximate to the absorbent pad. The test line is coated with an Aβ-binding polymer. The control line is coated with a goat anti-mouse IgG polyclonal antibody. The method is suitable for the following: routine clinical pathological examination; general screening of a large number of people and self-screening of home end-users; assisting the early diagnosis and prejudgment of mild cognitive impairment (MCI) clinically.

7 Claims, 6 Drawing Sheets

| Peptide | Method | α-Helix 1 | α-Helix 2 | β-Strand 1 | β-Strand 2 | Turns | Unordered | Total |
|---|---|---|---|---|---|---|---|---|
| Aβ | CDSSTR* | -0.01 | 0.02 | 0.31 | 0.14 | 0.3 | 0.23 | 0.97 |
| PPP | CDSSTR | -0.01 | 0.01 | 0.18 | 0.1 | 0.3 | 0.45 | 1.04 |
| Aβ/PPP | CDSSTR | 0.04 | 0.05 | 0.26 | 0.13 | 0.2 | 0.33 | 1.01 |

* Sreerama, N. and Woody, R.W. (2000), Analytical Biochemistry, 287, 252-260 and references therein.

TEST STRIP AND METHOD FOR DETECTING AMYLOID BETA IN URINE

CROSS REFERENCE TO THE RELATED APPLICATIONS

This application is the national stage entry of International Application No. PCT/CN2019/111303, filed on Oct. 15, 2019, the entire contents of which are incorporated herein by reference.

TECHNICAL FIELD

The present invention relates to a test strip and a method for detecting amyloid beta (Aβ) in urine.

BACKGROUND

Alzheimer's disease (AD), the most common dementia, affects more than 26 million people worldwide. It is found by the inventors and other investigators that a large proportion (30%) of the elderly without cognitive impairment exhibits high retention of PET ligands in the brain and low level of $A\beta_{1-42}$ in the cerebrospinal fluid (CSF), who are currently diagnosed as AD at the preclinical latency stage. Mild cognitive impairment (MCI) is seen as the prodromal stage of AD, and 40% to 60% of patients meeting the MCI criteria will eventually suffer from clinical AD, about 5% to 25% per year. Sporadic AD is mainly caused by the accumulation of Aβ and the failure of Aβ clearance. At present, the "amyloid cascade hypothesis" is generally supported in this research field, that is, the metabolic imbalance of Aβ in the brain is the root cause for neurodegeneration and cognitive decline of an AD patient. Many animal and genetic studies have shown that the innate phagocytosis of monocytes/macrophages/microglia may slow down the development of AD by promoting the clearance of Aβ and preventing the formation of senile plaques.

Biomarkers are promising to be an effective means for early diagnosis of AD, which is achieved by detecting the reduction of the size of the brain, especially of the hippocampus (using magnetic resonance imaging (MRI)), by detecting changes in functions of the brain (using functional MRI) or by detecting changes in the concentrations of $A\beta_{1-40}$, $A\beta_{1-42}$ and tau in CSF. However, the latter means is invasive, with low patient compliance. Another promising method is coordinated positron emission tomography (PET) [3]. Neuroimaging (MRI, PET and CT) is expensive, and the number of corresponding facilities available for clinical use is not adequate to meet the demand for population screening. Although studies have shown that the ratio of $A\beta_{1-42}/A\beta_{1-40}$ in plasma can be used as an effective biomarker for identifying patients who are potentially at high risk of MCI or AD, the detection of this biomarker requires special instruments and is not suitable for general population screening. Therefore, there is an urgent need to find a novel AD biomarker that is more practical, sensitive and specific.

AD is a physical systemic disease that involves not only the disorder and damage of the brain, but also the whole body. It has been found that plasma-soluble Aβ can be filtered out and excreted in the urine, which may reflect the change of Aβ in the brain circulation. Since the extremely-low concentration of Aβ in human urine is lower than the detection limit of the enzyme-linked immunosorbent assay (ELISA) detection method, there is no routine clinical diagnostic procedure for diagnosing MCI or AD by targeting the Aβ in urine at present. As the target antigen is too small, only of 4.3 kD, and prone to non-specific binding to other proteins, the commonly-used "sandwich ELISA" or "competitive ELISA" is difficult to achieve high sensitivity and specificity.

SUMMARY

The present invention is intended to overcome the shortcomings of the prior art, and to provide a test strip and a method for detecting Aβ in urine.

In order to achieve the foregoing objective, the present invention provides the following technical solution:

The present invention provides a test strip for detecting Aβ in urine, including a polyvinyl chloride (PVC) bottom plate (7). The PVC bottom plate (7) is laid with a sample pad (1), a conjugation pad (2), a chromatography pad (3) and an absorbent pad (4) that are overlapped in sequence. The conjugation pad (2) is coated with colloidal gold particles conjugated to a monoclonal antibody; the chromatography pad (3) is provided with a test line (5) on the side proximate to the conjugation pad (2), and is provided with a control line (6) on the side proximate to the absorbent pad (4); the test line (5) is coated with an Aβ-binding polymer; and the control line (6) is coated with a goat anti-mouse IgG polyclonal antibody.

Preferably, the Aβ-binding polymer is a small peptide chain randomly synthesized from glutamic acid, lysine, alanine and tyrosine, with a molecular weight of 4 kD to 52 kD.

Preferably, the anti-Aβ monoclonal antibody is a mouse anti-Aβ monoclonal antibody prepared by a mouse hybridoma cell line; or is at least one of monoclonal antibody 1E8, monoclonal antibody 4G8, monoclonal antibody W0-2 and monoclonal antibody 6E10.

Preferably, the sample pad (1) is coated with electrophoresis buffer at an amount of 10 μL/cm to 16 μL/cm; the conjugation pad (2) is coated with colloidal gold particles conjugated to a monoclonal antibody at an amount of 6 μL/cm to 9 μL/cm; the test line (5) is coated with a solution of the Aβ-binding polymer in phosphate-buffered saline (PBS) at an amount of 1.5 μL/cm to 2.5 μL/cm, which has a concentration of 2 mg/mL; and the control line (6) is coated with a solution of the goat anti-mouse IgG polyclonal antibody in PBS at an amount of 1.5 μL/cm to 2.5 μL/cm, which has a concentration of 200 μg/mL.

The present invention provides a method for detecting Aβ in urine, including: capturing Aβ in urine using colloidal gold particles conjugated to a monoclonal antibody to form a complex of colloidal gold particles and Aβ; and then using an Aβ-binding polymer to detect the complex of colloidal gold particles and Aβ; where, the colloidal gold particles have a particle diameter of 20 nm to 50 nm; the monoclonal antibody is an anti-Aβ monoclonal antibody; and the Aβ-binding polymer is a small peptide chain randomly synthesized from glutamic acid, lysine, alanine and tyrosine.

Preferably, the small peptide chain has a molecular weight of 4 kD to 52 kD.

Preferably, the anti-Aβ monoclonal antibody is a mouse anti-Aβ monoclonal antibody prepared by a mouse hybridoma cell line; or is at least one of monoclonal antibody 1E8, monoclonal antibody 4G8, monoclonal antibody W0-2 and monoclonal antibody 6E10.

The Aβ-binding polymer can be used for preparing an Aβ detection reagent, an MCI diagnostic reagent and an AD diagnostic reagent.

The present invention is further described below.

In the present invention, colloidal gold particles conjugated to a monoclonal antibody are adopted to capture Aβ in urine to form a complex of colloidal gold particles and Aβ, where the colloidal gold particles have a particle diameter of 20 nm to 40 nm. There is a group of phagocytosis-promoting peptides (Aβ-binding polymers, known as PPPs), and it is found that the group of PPPs includes some polymers and a small number of 15-mer peptides, and exhibits high affinity to $A\beta_{1-42}$. One polymer is a small peptide chain randomly synthesized from glutamic acid, lysine, alanine and tyrosine, with a molecular weight of 4 kD to 52 kD (average: 6.5 kD). The freshly-dissolved $A\beta_{1-42}$ and the old $A\beta_{1-42}$ have equilibrium dissociation constants ($K_D$) of 6.6 nM and 25.4 nM, respectively. This polymer is very promising to be used for detecting $A\beta_{1-42}$, and even can promote the clearance of Aβ within the human body. Therefore, an Aβ-binding polymer is then used to detect the complex of colloidal gold particles and Aβ, with high sensitivity and a detection limit of 40 picograms (pg). The entire immunochromatographic assay is integrated in the lateral flow chromatography test strip system, allowing rapid and economical detection. The method is suitable for: routine clinical pathological examination; general screening of a large number of people and self-screening of home end users; assisting the early diagnosis and prejudgment of MCI clinically; and predicting and judging whether the patient has a high risk of developing MCI and AD.

BRIEF DESCRIPTION OF THE DRAWINGS

FIG. 3A: the secondary structure of Aβ (0.2 mg/mL, 44 μM) is determined with circular dichroism (CD); FIG. 3B: the secondary structure of PPP (44 μM); FIG. 3C: the structure of Aβ and PPP is determined at the jumping state; and FIG. 3D: the secondary structure component is analyzed using the reference data set 3 compiled by Sreerama et al. with computer program CDSSTR.

FIG. 4A: a western blotting image shows Aβ staining, and each semi-quantitative 4.5 KD $A\beta_{42}$ monomer shows a bottom bar; FIG. 4B: Ponceau S staining is conducted after the protein is transferred to a nitrocellulose membrane, a lot of PPP and bovine serum albumin (BSA) are stained red, and the protein size is estimated by See-blue+2 standard pre-staining.

FIG. 2 to FIG. 7 show the results in the examples of the present invention.

DETAILED DESCRIPTION OF THE EMBODIMENT

Figure 1:
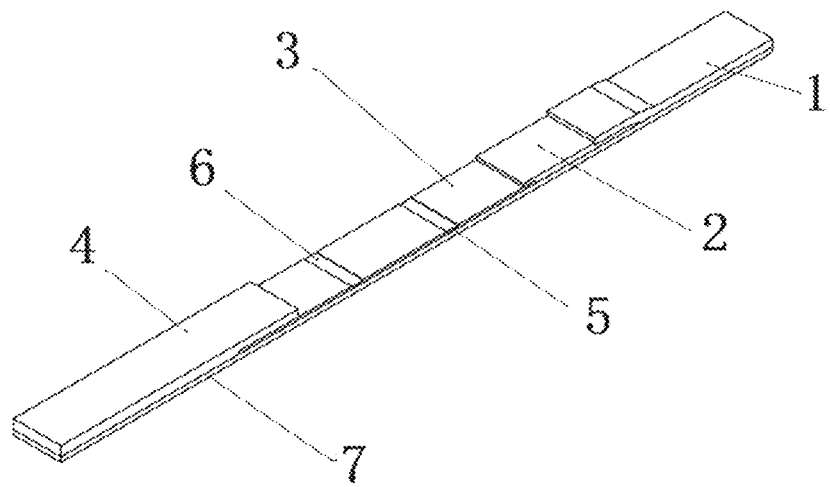
FIG. 1 is a schematic diagram for the structure of a test strip for detecting Aβ in urine, where: 1: sample pad; 2: conjugation pad; 3: chromatography pad; 4: absorbent pad; 5: test line; 6: control line; and 7: PVC bottom plate.

1. Production and Purification of Anti-Aβ Monoclonal Antibodies

A commercial mouse hybridoma cell line (BGM02) was purchased from Ab-Mart Pty Ltd. to produce mouse anti-Aβ monoclonal antibodies. Other commercial monoclonal antibodies, including 1E8, 4G8, W0-2, 6E10, etc., could also be used alone or in combination. A vented hydrophobic cell-culture flask was adopted. The hybridoma cells were thawed at 45° C. 1% of glutamine, 1% of streptomycin/penicillin and 20% of fetal bovine serum (FBS) were added to a serum-free hybridoma cell medium (% referred to the mass percentage of the component in the serum-free hybridoma cell medium).

When the culture medium turned yellow, the cells were subcultured. The proportion of serum in the medium for subculture decreased from 20% to 10%, 5%, 2% and 0%, and the cells could survive in the final serum-free medium. This process usually takes one month. The supernatant must not be pipetted until the serum is completely consumed.

When a medium was added to a bioreactor, the cell suspension was centrifuged, and the resulting supernatant was removed. The cells were aggregated and collected in a syringe, and then inoculated in the medium. The hybridoma cells were cultured in a serum-free medium in a bioreactor for 10 d to 15 d, and the cell culture supernatant was collected.

The antibody was purified by affinity chromatography with the recombinant protein A binding to resin.

The pH of the culture supernatant for hybridoma cells was adjusted to 7.5 with 1N NaOH or 1N HCl. Then the culture supernatant was centrifuged at 3,600 rpm for 20 min with a desk centrifuge, or at 7,500 r/min for 10 min with a high-speed centrifuge (preferred) to remove all cell debris and precipitate.

The culture supernatant was loaded into the recombinant protein A column at high flow. a 0.22 μm pre-filter or a pre-filter with a glass fiber membrane could be adopted. The landing speed was maintained below 2 mL/min. The column was washed with at least 50 ml of PBS.

Elution was conducted (at a rate of 1 mL/min) with 50 mL of 40 mM trisodium citrate (pH 3.0), and the eluate was collected with a fraction collector. All collections were immediately neutralized with $Na_2HPO_3$ buffer (0.5 M, pH 9.5). The column was immediately rinsed after elution. The concentration was determined with an A280/A260 spectrophotometer or a protein detection kit for the antibody solutions placed in centrifuge tubes together. The antibody was dispensed and stored at −80° C.

2. Preparation of 30 nm Colloidal Gold Particles 200 mL of 0.01% $HAuCl_4$ solution was slowly stirred and boiled. The solution was boiled for 2 min, then stirred at a higher speed, and immediately added with 2.0 mL of 1% trisodium citrate rapidly. The resulting solution was continuously boiled until the solution turned red/purple, and then further boiled for 5 min. The particles were checked under an electron microscope. The expected particle size is 30 nm. The particle size can be adjusted by the volume of the 1% trisodium citrate, and the volumes of 8.0 mL, 6.0 mL, 4.0 mL and 1.5 mL correspond to particle sizes of 10 nm, 15 nm, 20 nm and 50 nm, respectively.

The solution was cooled to room temperature, and the pH was adjusted to 7.2 with 0.1 M $K_2CO_3$. The cooled solution was centrifuged at 10,000 g for 30 min without braking, the supernatant was reduced to about 20 mL, and the obtained particles were stored at 4° C.

3. Conjugate Coupling of Colloidal Gold Particles to a Monoclonal Antibody

100 μL of 5 mM boric acid buffer (pH 9.0) was added to tubes 1 to 10 separately; then 100 μL of an antibody solution was added to tube 1, and the resulting mixture was well mixed; a serial dilution was conducted at a certain ratio from tube 1 to tube 9 in sequence; and only 100 μL of boric acid buffer was added to tube 10. 100 μL of colloidal gold solution (the pH was adjusted to 9.0 with 0.1 M $K_2CO_3$) was added to each tube. The resulting mixture was well mixed and incubated for 10 min. 10 μL of 10% sodium chloride solution was added, and the resulting mixture was well mixed, and stood for 60 min to 120 min. If the protein content is sufficient, the color will not change. If the protein content is not sufficient, the color in tube 10 will turn dark blue. This method can be used to find the minimum protein content ($X_{min}$) required for 20 mL of colloidal gold particle solution.

The colloidal gold particle solution (the pH was adjusted to 9.0 with 0.1 M $K_2CO_3$) was added with an antibody (in 5 mM borate buffer, pH 9.0) at an amount increased by 10% on the basis of $X_{min}$. The resulting solution was placed in a shaker for 15 min at room temperature.

The saturation was checked by adding 5 μL of 10% NaCl to 50 μL of labelled colloidal gold. The resulting mixture stood for 30 min. If the gold does not precipitate out by changing to a blue color, it is saturatedly labelled.

1% polyethylene glycol (PEG) (20 kD, the pH was adjusted to 7.2 with 1% trisodium citrate or 0.1 M $K_2CO_3$) was added to achieve the final concentration of 0.1%.

The resulting solution was centrifuged at 260 g for 20 min, and impurities (small particles) were removed for the supernatant.

Then the supernatant was centrifuged at 10,000 g for 30 min without braking. 0.2% PEG was added to 4 mM phosphate/citrate buffer (pH 6.8) to obtain a final volume of 10 mL. The particles were resuspended and stored at 4° C. 10% of sucrose was added before use.

4. Assembly of a Lateral Flow Chromatography Test Strip

As shown in FIG. 1, the test strip for detecting Aβ in urine includes a PVC bottom plate 7. The PVC bottom plate 7 is laid with a sample pad 1, a conjugation pad 2, a chromatography pad 3 and an absorbent pad 4 that are overlapped in sequence. The conjugation pad 2 is coated with colloidal gold particles conjugated to a monoclonal antibody; the chromatography pad 3 is provided with a test line 5 on the side proximate to the conjugation pad 2, and is provided with a control line 6 on the side proximate to the absorbent pad 4; the test line 5 is coated with an Aβ-binding polymer; and the control line 6 is coated with a goat anti-mouse IgG polyclonal antibody.

The specific assembly process is as follows.

The sample pad and conjugation pad were soaked in blocking buffer (20 mM sodium tetraborate, pH 8.0, 2% BSA and 0.05% $NaN_3$) at 4° C. for 3 h or overnight. A liner was washed once with distilled water (or UPW) at room temperature for 15 min, and then dried at 37° C.

The sample pad was cut into strips with a width of 15 mm, and sprayed with electrophoresis buffer (20 mM sodium tetraborate, pH 8.0, 8% BSA, 0.05% Tween-20, and 0.05% $NaN_3$) at an amount of 10 μL/cm.

The conjugation pad was cut into strips with a width of 10 mm. The labelled colloidal gold was sprayed on the conjugation pad at an amount of 6 μL/cm to 9 μL/cm.

Two lines were scribed on the chromatography pad (nitrocellulose membrane) at a spacing of 8 mm, namely, the test line and the control line. The test line was coated with a solution of the polymer PPP in 10 mM PBS at an amount of 2.5 μL/cm, which had a concentration of 2 mg/mL. The control line was coated with a solution of the goat anti-mouse IgG polyclonal antibody in PBS at an amount of 2.5 μL/cm, which had a concentration of 500 μg/mL. Each line was 1 mm wide and 4 mm long.

The absorbent pad was cut into strips with a width of 15 mm.

The above components were assembled on a 60 mm×300 mm bottom plate, and the resulting object was cut into 75 strips with a width of 4 mm. Each test strip was assembled into a plastic housing.

5. Use of the Lateral Flow Chromatography Test Strip for Detecting Aβ in Urine

Urine samples can be collected at any time of the day, but the determination is preferably conducted on the same day. Urine samples can be freshly frozen at −80° C., but repeated freezing and thawing are not allowed.

100 μL of urine sample was slowly added dropwise via a sample-loading port of the kit housing. The kit stood for 20 min, and then the test line and control line were checked.

Optimally, the results were read visually or by the colloidal gold immunochromatographic analyzer within 2 h.

Determination of Results:

Negative (−): only the control line is colored.

Weak positive (+/−): the test line is slightly colored, while the control line is clearly colored.

Positive (+): the test line is colored at an intensity consistent with that of the control line Strong positive (++): the test line is clearly colored, and the control line is normally or lightly colored.

Extremely-strong positive (+++): the test line is clearly and deeply colored, and the control line is extremely-lightly colored or may not be colored.

6. Polymer Identifying Aβ

Figure 2:
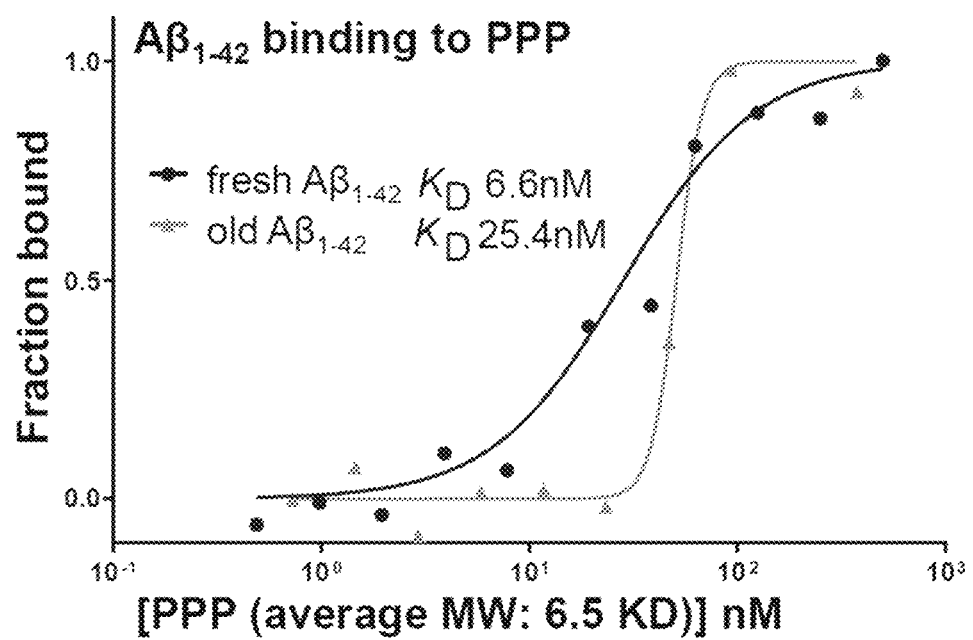
FIG. 2 shows the direct binding of PPP to $A\beta_{1-42}$, with high affinity, where: $A\beta_{1-42}$ (in PBS, with a final concentration of 80 nM) is labelled with HiLyte Fluor 488, then serially diluted at 1:1 (volume), and mixed with PPP; and the measurement is conducted in a standard processing capillary of NT.115 system, with 95% LED and 40% infrared laser power.
Figure 3A:
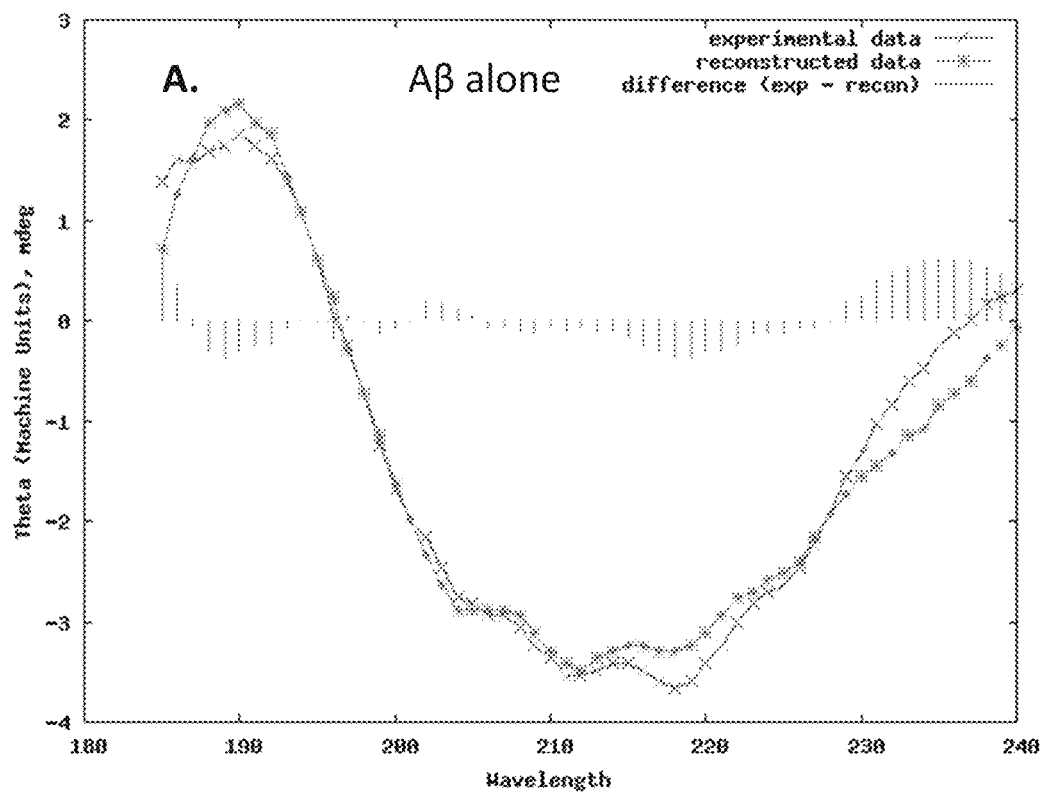
FIGS. 3A-3D show the interaction between $A\beta_{1-42}$ and PPP, where
Figure 3B:
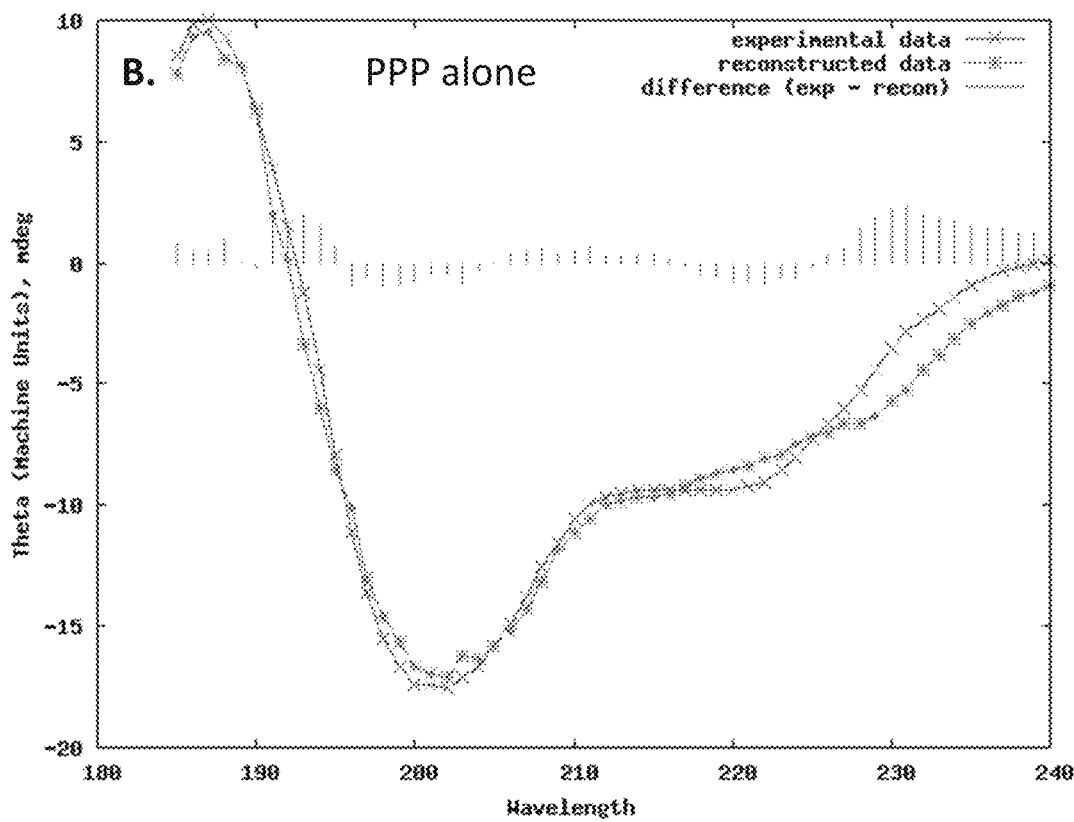
Figures 3C, 3D:
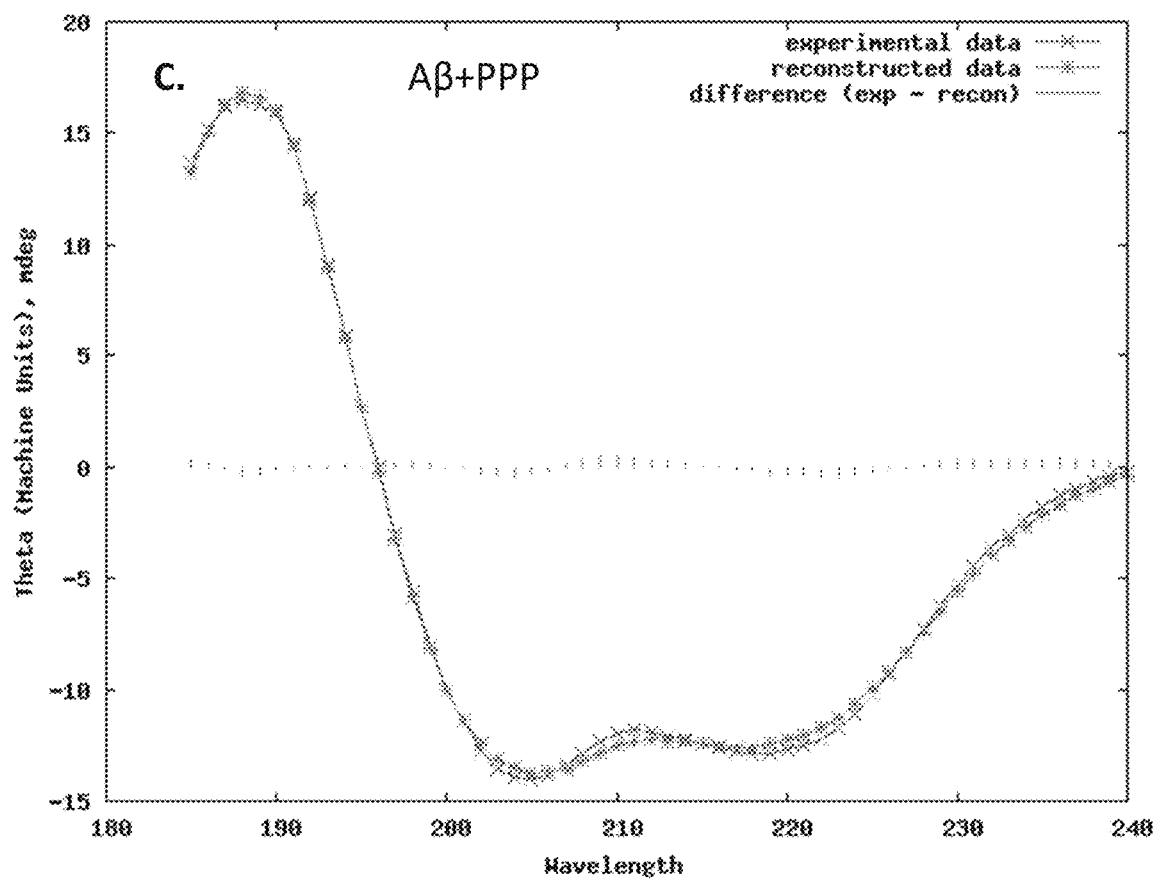

It was tested whether PPP could interact with Aβ Microscale thermophoresis (MST) of Nano Temperor was adopted to determine the affinity between PPP and $Aβ_{1-42}$. $Aβ_{1-42}$ (in PBS, 80 nM) was labelled with HiLyte Fluor 488. PPP was serially diluted at 1:1 (volume), with an average molecular weight of 6.5 KD. The measurement was conducted in a standard processing capillary under the Monolith NT.115 system, with 95% LED and 40% infrared laser power. The result showed a high affinity binding between PPP and $Aβ_{1-42}$ with $K_D$=6.6 nM. The stoichiometric ratio of PPP to $Aβ_{1-42}$ monomer is 3. Even if $Aβ_{1-42}$ is placed at 4° C. for one week to allow more oligomers and fiber structures to be precipitated, the effective $K_D$ value is still as low as 25.4 nM (FIG. 2), which is similar to the affinity of an anti-Aβ monoclonal antibody.

Circular dichroism (CD) is a practical method for studying the peptide-peptide interaction in a solution. The CD in the far ultraviolet region (178 nm to 260 nm) is derived from the amide of the protein backbone, and is sensitive to the protein conformation. Therefore, CD can be used to determine whether the conformations of polypeptides change during the interaction of polypeptides. CD can be used to detect $A\beta_{1-42}$ and PPP and obtain the related results (FIGS. 3A-3D). CD is a quantitative analysis technique. Once the interaction between $A\beta_{1-42}$ and PPP occurs, the change in the CD spectrum is proportional to the amount of the peptide-peptide complex formed. The results indicate that the β-pleated sheet is preferably formed in $A\beta_{1-42}$, while no distinct β-pleated sheet can be seen in PPP. This complex exhibits a distinctly different structure, which indicates the interaction between $A\beta_{1-42}$ and PPP (FIGS. 3A-3D).

Figure 4A:
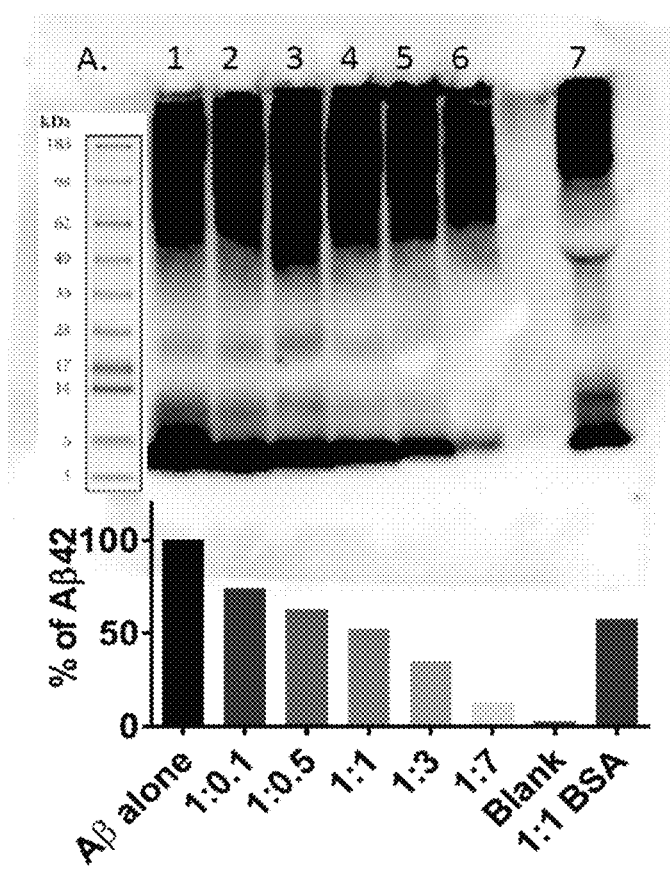
FIGS. 4A-4B show the tight binding of PPP to $A\beta_{42}$, where: $A\beta_{42}$ (each 10 μg, 2.2 nmol) is mixed with different amounts of PPP (0 nmol, 0.22 nmol, 1.1 nmol, 2.2 nmol, 6.6 nmol and 15.4 nmol, columns 1 to 6) or 2.2 nmol of serum album (column 7); the resulting mixtures (30 μL for each sample) are diluted with 50 μM DTT and heated at 90° C. for 5 min prior to SDS-PAGE (4% to 12% NuPage gel, MES buffer, 100 V for 50 min); the protein is transferred and detected with an anti-Aβ monoclonal antibody (clone W0-2)
Figure 4B:
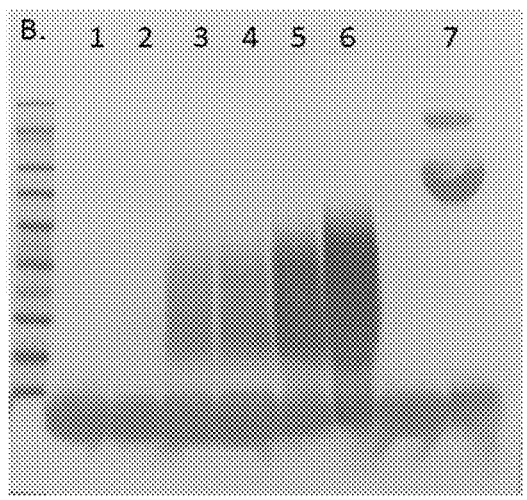

The interaction between $A\beta_{1-42}$ and PPP was further studied using western blotting. The synthesized $A\beta_{1-42}$ was mixed with different amounts of PPP at different ratios, and then the mixture was subjected to the simplified electrophoresis of SDS-PAGE. By reducing the dosage for electrophoresis, it can be found that PPP can significantly retain $A\beta_{1-42}$, even under the simplification condition of decrement (FIGS. 4A-4B), indicating the tight binding between $A\beta_{1-42}$ and PPP.

Therefore, unlike the traditional lateral flow immunochromatography using a polyclonal antibody, the present invention uses PPP as a capture molecule to detect Aβ binding to conjugated colloidal gold particles. Compared with ELISA, this method greatly improves the detection sensitivity.

Figure 5:
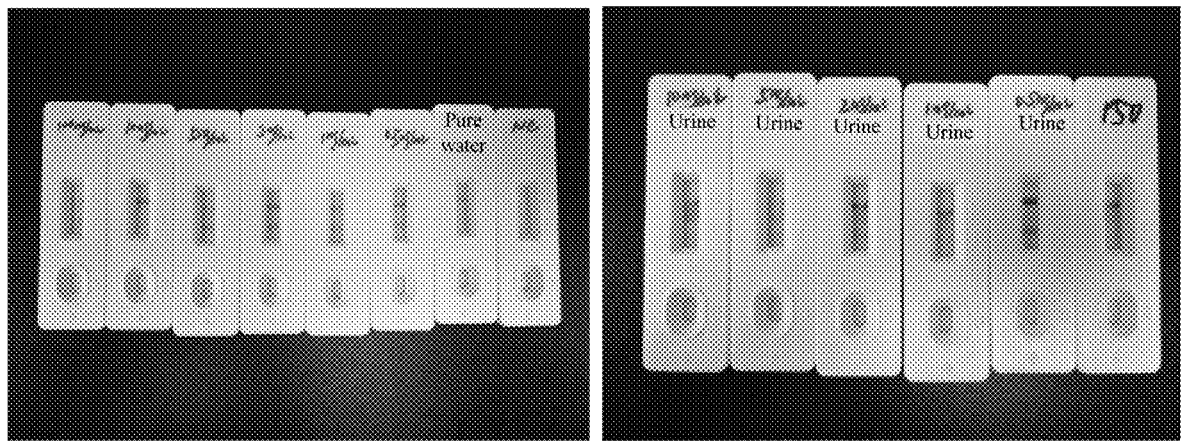
FIG. 5 shows the detection results of test strips for the solutions of the synthesized $A\beta_{42}$ in 100 μL of ultrapure water (UPW) (left panel) and the solutions of the synthesized $A\beta_{42}$ in 100 μL of urine (right panel), where: the solutions have a final concentration of 0 ng/mL to 5 ng/mL.

7. the Clinical Use of the Lateral Flow Chromatography Test Strip for Detecting Aβ in Urine First, 100 μL of MilliQ UPW was used to prepare the solutions of the synthesized $A\beta_{42}$ with different concentrations, from 0 ng/mL to 100 ng/mL, and then the resulting solutions were tested with test strips separately. The results show that there is an excellent correlation from 0 ng/mL to 5 ng/mL, and the results at high concentrations do not further increase the intensity of the T line, which may be caused by excessive antigens (FIG. 5).

Then $A\beta_{42}$ was added to a negative urine sample, and then detected with a test strip. The results are consistent with test results for $A\beta_{42}$ samples prepared with UPW. When urine samples with 0.5 ng/mL to 5 ng/mL of $A\beta_{42}$ were detected, the T-line was developed, and the excessive antigens (10 μg/mL) also did not exhibit detection results ascending proportionally (FIG. 5).

Figure 6:
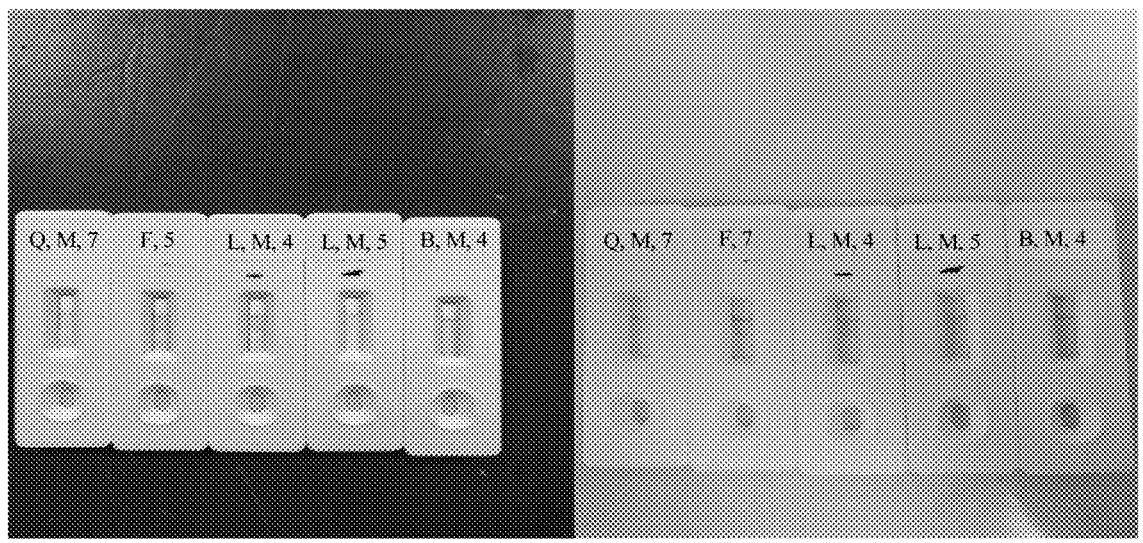
FIG. 6 shows the collection and detection of urine samples from healthy children by the Aβ test paper of the present invention, with 100 μL of urine sample for each test paper.

The test strip of the present invention was tested with urine samples from healthy children under 10 years old (FIG. 6). More than 90% of urine samples from healthy children have negative results.

Figure 7:
FIG. 7 shows examples of clinical sample testing.

These test strips were tested with urine samples from 152 Han Chinese (FIG. 7). The subjects of the study were outpatients recruited from the Department of Neurology at Huashan Hospital of Fudan University in Shanghai, China. There were 55 males, with an average age of 68.5; and 97 females, with an average age of 68.1. The subjects had an age ranging from 42 to 89, and were 68.3 years old on average.

The subjects include the following:
(1) Normal cognition control group (n=30): none develops with a known age-related disease; the score of Mini-Mental State Examination (MMSE) is not less than 27; and 22 in this group complains of memory loss at the outpatient department recently, and the other 8 are family members of the patients.
(2) MCI group (n=47): clinical evaluation (MMSE score: 22 to 30), early AD patients are included.
(3) Mild AD group (n=37): MMSE score: 10 to 20.
(4) Severe AD group (n=6): MMSE<10.
(5) Other types of dementia group (n=21): there are 15 vascular dementia patients, 3 frontotemporal dementia patients, and 3 Lewy body dementia patients.
(6) Parkinson's disease group (n=3).

Routine urine test was conducted for each urine sample. High protein (2+ or higher) urine samples were excluded.

The overall results (Table 1) show that a higher detection rate is exhibited for the MCI and early/mild AD, which are accompanied with other types of dementia, indicating that these test strips have a higher potential for clinical diagnosis of MCI and AD.

TABLE 1

Test results for Aβ by test strips

| | N | − | ± | + | ++ | +++ | Positive rate % |
|---|---|---|---|---|---|---|---|
| Normal cognition level group | 30 | 4 | 7 | 17 | 2 | 0 | 86.6 |
| MCI/early AD group | 47 | 2 | 13 | 30 | 2 | 0 | 95.7 |
| Mild AD | 37 | 2 | 8 | 19 | 7 | 1 | 94.5 |
| Advanced AD | 6 | 1 | 0 | 4 | 1 | 0 | 83.3 |
| Other types of dementia | 21 | 0 | 5 | 13 | 1 | 0 | 100 |
| Parkinson's disease | 3 | 0 | 2 | 1 | 0 | 0 | 100 |

What is claimed is:

1. A test strip for detecting amyloid beta (Aβ) in urine, comprising a polyvinyl chloride (PVC) bottom plate, wherein,
   the PVC bottom plate is laid with a sample pad, a conjugation pad, a chromatography pad and an absorbent pad, wherein the sample pad, the conjugation pad, the chromatography pad and the absorbent pad are overlapped in sequence;
   the conjugation pad is coated with colloidal gold particles conjugated to a monoclonal antibody;
   the chromatography pad is provided with a test line on a first side closer to the conjugation pad, and is provided with a control line on a second side closer to the absorbent pad;
   the test line is coated with an Aβ-binding polymer; and
   the control line is coated with a goat anti-mouse IgG polyclonal antibody.

2. The test strip according to claim 1, wherein, the Aβ-binding polymer is a peptide chain randomly synthesized from at least one of: glutamic acid, lysine, alanine and tyrosine, with a molecular weight of 4 kD to 52 kD.

3. The test strip according to claim 1, wherein,
   the anti-Aβ monoclonal antibody is a mouse anti-Aβ monoclonal antibody prepared by a mouse hybridoma cell line; or
   the anti-Aβ monoclonal antibody is at least one selected from the group consisting of monoclonal antibody 1E8, monoclonal antibody 4G8, monoclonal antibody W0-2 and monoclonal antibody 6E10.

4. The test strip according to claim 1, wherein,
   the sample pad is coated with electrophoresis buffer at an amount of 10 μL/cm to 16 μL/cm;
   the conjugation pad is coated with the colloidal gold particles conjugated to the monoclonal antibody at an amount of 6 μL/cm to 9 μL/cm;
   the test line is coated with a solution of the Aβ-binding polymer having a concentration of 2 mg/mL in phosphate-buffered saline (PBS) at an amount of 1.5 μL/cm to 2.5 μL/cm; and the control line is coated with a solution of the goat anti-mouse IgG polyclonal antibody having a concentration of 200 μg/mL in PBS at an amount of 1.5 μL/cm to 2.5 μL/cm.

5. A method for detecting Aβ in urine, comprising:
capturing Aβ in urine by using colloidal gold particles having a particle diameter of 20 nm to 50 nm and conjugated to a monoclonal antibody to form a complex of the colloidal gold particles and the Aβ; and then using an Aβ-binding polymer to detect the complex of the colloidal gold particles and the Aβ;
wherein, the monoclonal antibody is an anti-Aβ monoclonal antibody; and the Aβ-binding polymer is a peptide chain randomly synthesized from at least one of: glutamic acid, lysine, alanine and tyrosine.

6. The method according to claim 5, wherein the peptide chain has a molecular weight of 4 kD to 52 kD.

7. The method according to claim 5, wherein,
the anti-Aβ monoclonal antibody is a mouse anti-Aβ monoclonal antibody prepared by a mouse hybridoma cell line; or
the anti-Aβ monoclonal antibody is at least one selected from the group consisting of monoclonal antibody 1E8, monoclonal antibody 4G8, monoclonal antibody W0-2 and monoclonal antibody 6E10.

* * * * *